United States Patent [19]

Lund

[11] Patent Number: 4,983,343

[45] Date of Patent: Jan. 8, 1991

[54] PRESSURE ROLLER INCLUDING AIR RELIEF MECHANISM

[75] Inventor: Robert E. Lund, Minneapolis, Minn.

[73] Assignee: International Multifoods Corporation, Minneapolis, Minn.

[21] Appl. No.: 240,966

[22] Filed: Sep. 6, 1988

[51] Int. Cl.⁵ .......................... B28B 3/18; B29B 9/06
[52] U.S. Cl. ...................... 264/142; 425/310; 425/331; 425/365; 425/812; 425/DIG. 230
[58] Field of Search ............... 425/145, 147, 159, 331, 425/DIG. 230, 222, 310, 365, 812; 264/142

[56] References Cited

U.S. PATENT DOCUMENTS

| | | | |
|---|---|---|---|
| 1,467,883 | 9/1923 | Sizer | 425/331 |
| 1,804,283 | 5/1931 | Sizer | 425/DIG. 230 |
| 2,177,132 | 10/1939 | Crabtree | 425/331 |
| 2,700,940 | 2/1955 | Johnson | 425/331 |
| 2,757,621 | 8/1956 | Johnson | 425/331 |
| 2,875,709 | 3/1959 | Landers | 425/331 |
| 2,887,718 | 5/1959 | Curran et al. | 264/13 |
| 3,101,510 | 8/1963 | Packham | 425/306 |
| 3,117,343 | 1/1964 | Soars, Jr. | 425/331 |
| 3,167,813 | 2/1965 | Keefe | 425/331 |
| 3,191,227 | 6/1965 | Keefe | 425/331 |
| 3,199,465 | 8/1965 | Cunningham | 425/331 |
| 3,234,894 | 2/1966 | Dechert | 425/331 |
| 3,307,501 | 3/1967 | Wenger | 425/331 |
| 3,363,588 | 1/1968 | Harrington et al. | 425/331 |
| 4,380,424 | 4/1983 | Skoch et al. | 425/331 |
| 4,403,936 | 9/1983 | Heesen | 425/331 |
| 4,452,733 | 6/1984 | Horiuchi et al. | 425/812 |
| 4,498,856 | 2/1985 | Botha et al. | 425/331 |
| 4,659,299 | 4/1987 | Pierik | 425/72.1 |
| 4,669,966 | 6/1987 | von Deuren | 425/209 |
| 4,820,469 | 4/1989 | Walsh et al. | 425/382.3 |

OTHER PUBLICATIONS

Pellet Mill Operators Manual (1982), American Feed Manufacturer's Association, Inc., Arlington, VA 22209.
CPM Pacific Pelleting Handbook (published on or before Feb. 22, 1988), CPM/Pacific Ltd. (Division of Ingersoll-Rand, Singapore).
The Pelleting Process (copyright Koppers Co., Inc., 1982) Sprout-Waldren Corp. (subsidiary of Combustion Engineering, Inc., Muncy, PA).

Primary Examiner—Jay H. Woo
Assistant Examiner—James P. Mackey
Attorney, Agent, or Firm—Merchant, Gould, Smith, Edell, Welter & Schmidt

[57] ABSTRACT

A pressure roller for cooperative drive relation with an inner annular surface of an annular rotative extrusion die of a pellet mill is provided. The pressure roller includes a substantially circular ring having a substantially circular cross-section, a circumferential outer surface and a longitudinal axis. The circular ring includes air relief mechanism, including an air relief channel, in the outer surface for channeling air escaping from particulate feed material compressed between the roller and the inner surface of the extrusion die. The channel extends at an angle with respect to a line parallel to the longitudinal axis.

21 Claims, 3 Drawing Sheets

PRESSURE ROLLER INCLUDING AIR RELIEF MECHANISM

FIELD OF THE INVENTION

The present invention relates to pressure rollers for extrusion-type pellet mills. The novel roller provides an air relief mechanism which facilitates the removal of air entrained in particulate feed material fed into a pellet mill and compressed therein during pellet extrusion processing.

BACKGROUND OF THE INVENTION

Extrusion-type pellet mills and the process of pelleting particulate feed material using such devices is old in the art. The processing of particulate feed material is, nevertheless, quite complex. In order to process feed efficiently, it is important to take many factors into account during the design and operation of the system. Pelleting has been defined as an extrusion-type thermoplastic molding operation in which finely divided particles of feed are formed into a compact, easily handled, pellet. The process is thermo-plastic because the protein and sugar components in the feed become plastic or moldable when heated and diluted with moisture. Pellet mills are designed to compress feed and force it through extrusion passages in an extrusion die when the moist feed has been heated. During this process, the feed is compressed and molded, and pellets are formed.

Pelleted feed is known to be highly desirable because it, among other things, allows better utilization or conversion of the feed ingredients, prevents selective feeding on favored ingredients, increases density, and provides better feed handling characteristics which simplify bulk handling.

Pellets are generally formed in a pellet mill when the feed is compressed between a pressure roller and an extrusion die. All the other parts of the pellet mill simply facilitate the continuous compression of feed between the pressure rollers and the die and the handling of the extruded pellets. Each pellet mill is generally equipped with a die and roller assembly which often includes a plurality of pressure rollers, an extrusion die, and a mechanism for delivering feed material evenly along an inner surface of the extrusion die so that the feed can be compressed by the pressure rollers when they roll over the inner surface or compression surface of the die. Each roller assembly generally has an optimum efficiency velocity depending upon the sieve analysis or density of the feed being pelleted and the characteristics of the die and roller assembly. Obviously, it is desirable to produce as much pelleted feed material as possible over any particular period of time. However, the design of the roller assembly and its various parts, create limitations to the production efficiency of any particular roller assembly. Much of the effort to improve roller assembly design has been concentrated on the design of the pressure rollers.

Landers (U.S. Pat. No. 2,875,709) discloses a dimpled pressure roller for a pellet mill which is designed to improve the traction of the pressure roller and, therefore, the force of the pressure roller upon the feed material in relation to the contact point with the extrusion die. This force acts to compress the material and extrude it and is called the roll force.

In spite of various efforts to improve the traction of the pressure rollers, limitations still existed with respect to the velocity at which the pressure rollers compress the feed on the inner surface of the die. If the velocity is too great, air entrained in the feed will be driven out of the feed ahead of the roller as the roller rolls along the inner surface of the extrusion die. This air will push the feed away from the roller and cause a build up of feed in front of the roller so that it exceeds the intended depth of feed in front of the roller in the feed wedge. Unfortunately, there is generally a large amount of air entrained in the feed and it must go somewhere. This is especially true for feed materials, such as materials intended for newborn animals which may contain large amounts of whey and may have densities below about 32 pounds per cubic foot. The faster the roller turns over the compression surface of the die, the faster the air is forced out of the feed. When the roller turns too fast, the feed builds up in front of the roller. This is a classic problem which generally limits the speed at which pellet mills can be operated. When the build up of feed in the feed wedge is too great, the roller often slips on the feed wedge forcing the wedge to squirt along the inner surface of the extrusion die in front of the roller. This event is called a roll slip. Rather than rolling over the feed, the roller pushes the feed ahead. When this occurs, the tangential force of the feed wedge sliding across the die surface, wears the die, thereby reducing its useful life. Production may even need to be shut down because of the heat produced by the friction between the wedge and the die surface, which can result in a fire.

It will be appreciated that any improvement in the design of a pellet mill, or any of its parts, which reduces the potential for a build up of feed in the feed wedge, thereby lessening the tendency to cause roll slips, will reduce the frictional wear on the surface of the extrusion die, thereby lengthening its useful life. It will be further appreciated that this problem limits production efficiency because the operating velocity must be limited. Other problems also exist which are in need of solutions. The present invention provides solutions for these and other problems associated with pelleting and pellet mills in general. In addition, the present invention offers other advantages over the prior art, and solves other problems therewith.

SUMMARY OF THE INVENTION

In accordance with the present invention, a pressure roller for cooperative drive relation with an inner annular surface of an annular rotative extrusion die of a pellet mill is provided. The pressure roller comprises a substantially circular ring having a substantially circular cross-section, a circumferential outer surface and a longitudinal axis. The circular ring includes air relief means in the outer surface for channeling air escaping from particulate material compressed between the roller and the inner surface of the extrusion die. The air relief means include an air relief channel. The channel extends at an angle with respect to a line parallel to the longitudinal axis. Preferably, the angle is at least about 5°. Preferred embodiments include a plurality of air relief channels in the outer surface. Alternate embodiments include channels extending around or across the outer surface.

An objective of the present invention is to provide a pressure roller that will facilitate the removal of air entrained in particulate feed material as it is compressed between the roller and the extrusion die. This allows the feed to be compressed at greater velocities, while less feed is blown out in front of the roller, causing a buildup of feed in the feed wedge and resulting in roll slips and unwanted frictional wear on the parts of the die and roller assembly.

Another objective is to provide a pressure roller for use with a typical pellet mill extrusion die, wherein the roller will allow greater roller velocity while minimizing the chance of causing roll slips.

An additional objective is to provide a pressure roller which will provide for an increase in the useful life of both the friction driven pressure roller and, particularly, the extrusion die. This results from a reduction in the slippage which occurs at the contact points between the roller and the feed wedge and between the feed wedge and the die.

Still another objective is to provide a pressure roller which will allow efficient pellet production for feed materials having densities below about 32 pounds per cubic foot. The present rollers are particularly effective with such feed materials.

The Applicant has confirmed that pellet mill efficiency can be improved by providing air relief means including an air relief channel or channels in the circumferential outer surface of the pressure roller or rollers which compress the feed material against the inner surface of the extrusion die. The provision of an air relief channel, preferably providing for an escaping air velocity of about 700-1300 feet per minute, allows both air within the channel and air entrained in the feed material to escape from the feed material while minimizing the amount of feed material forced out ahead of the roller. Because there is less feed forced out in front of the feed wedge by the air escaping from the particulate feed material when the particulate material is compressed, there are fewer roll slips. Consequently, there is less frictional wear on the rollers and the extrusion die. Therefore, it is extremely advantageous to use the rollers of the present invention because they reduce the frequency of roll slips, thereby reducing the frictional wear on the rollers and the extrusion die. This extends the useful life of the die and roller assembly, and allows for a greater throughput before a replacement assembly must be put in place. This results in a significant cost savings.

An alternate embodiment of the present invention provides a plurality of air relief channels extending across the circumferential outer surface at an angle to a plane perpendicular to the longitudinal axis of the roller. As used in the phrase "channel [or channels] traversing across said outer surface," the words "traversing across" mean extending along the circumferential outer surface at an angle to a plane perpendicular to the longitudinal axis of the roller. The term escaping air velocity, as used herein, means the velocity of the air passing through the air relief channels of the present rollers.

Another alternate embodiment includes at least one, preferably a plurality, of air relief channels which extend around at least a portion of the circumferential outer surface at a 90° angle to the longitudinal axis, or parallel to a plane perpendicular to the longitudinal axis. Most preferably, this channel, or these channels, extend 360° around the circumferential surface of the pressure roller of the present invention. In such a case, the width and depth of the air relief channel or channels may be designed to provide for optimum pellet mill efficiency in handling feed materials having various densities or sieve analyses.

The above-described features and advantages along with various other advantages and features of novelty are pointed out with particularity in the claims of the present application. However, for a better understanding of the invention, its advantages, and objects attained by its use, reference should be made to the drawings which form a further part of the present application, and to the accompanying descriptive material in which there is illustrated and described preferred embodiments of the present invention.

BRIEF DESCRIPTION OF THE DRAWINGS

In the drawings, in which like and primed reference numerals and letters indicate corresponding parts throughout the several views.

DETAILED DESCRIPTION OF THE PREFERRED EMBODIMENTS OF THE PRESENT INVENTION

Figure 1:
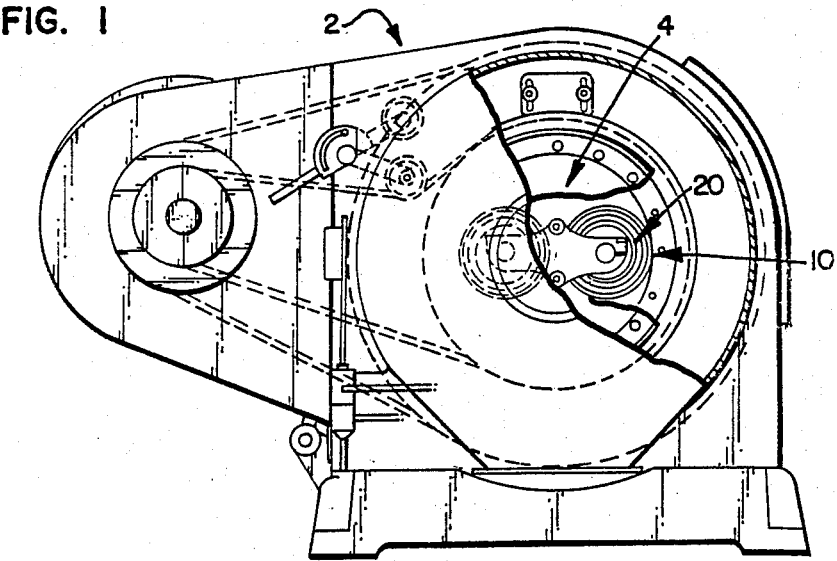
FIG. 1 is a side view of an extrusion-type pellet mill of the kind commonly used in the art.

Referring now to the drawings, in FIG. 1, an extrusion-type pellet mill 2 including a die and roller assembly 4 is shown. This particular roller assembly 4 has two pressure rollers 20, although other devices may employ one, two, three or even four or more rollers 20.

Figure 2:
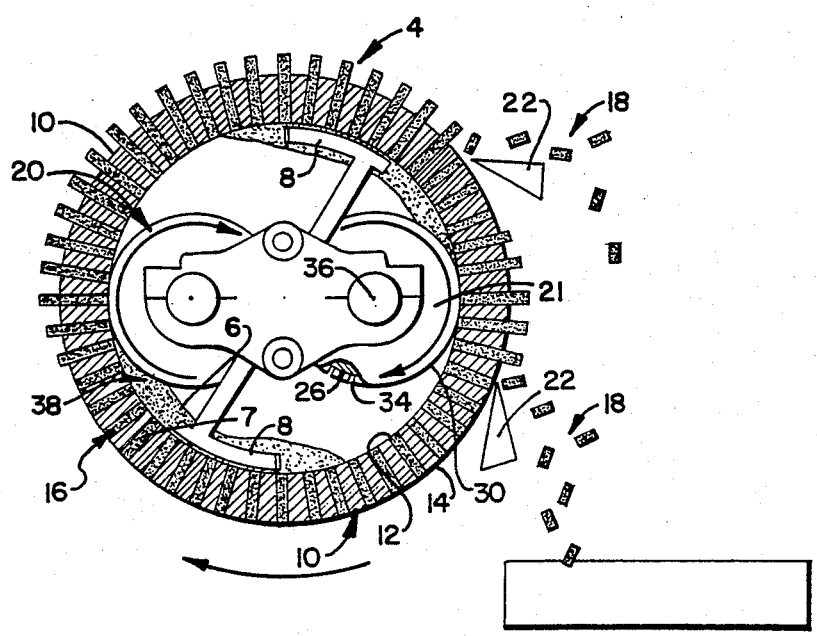
FIG. 2 is a side view of a die and roller assembly portion of a pellet mill during pellet production.

Referring now also to FIG. 2, a schematic side view of the die and roller assembly 4 is shown to illustrate the operation of the roller assembly 4 during pelleting operations. The assembly 4 includes an extrusion die 10, two pressure rollers 20 which turn in the same direction as the die 10 compressing feed material 6 delivered by the feed delivery mechanism 8. The feed material 6 is compressed as the pressure rollers 20 turn with the movement of the die 10. As the rollers 20 turn and advance along the compression surface 12 of the die 10, the feed material 6 is compressed and forced through extrusion passages 16. In addition to being compressed, the feed material 6 is molded in the extrusion passages 16. The molded feed material 7 emerges from the extrusion passages 16 on the outside or extrusion surface 14 of the die 10. Blades 22 are positioned along the extrusion surface 14 of the die such that the blades sever the extruded portion of the compressed feed material extending beyond the extrusion surface 14, thereby separating the finished feed pellets 18 from the compressed feed material 7 remaining in the extrusion passages 16. These passages 16 remain filled with compressed feed material 7 throughout the operation of the pellet mill 2.

Referring now also to FIGS. 3, 4, 5 and 6, the present invention provides a pressure roller 20 for cooperative drive relations with an inner annular surface 12 of an annular rotative extrusion die 10 of a pellet mill 2.

Figure 3:
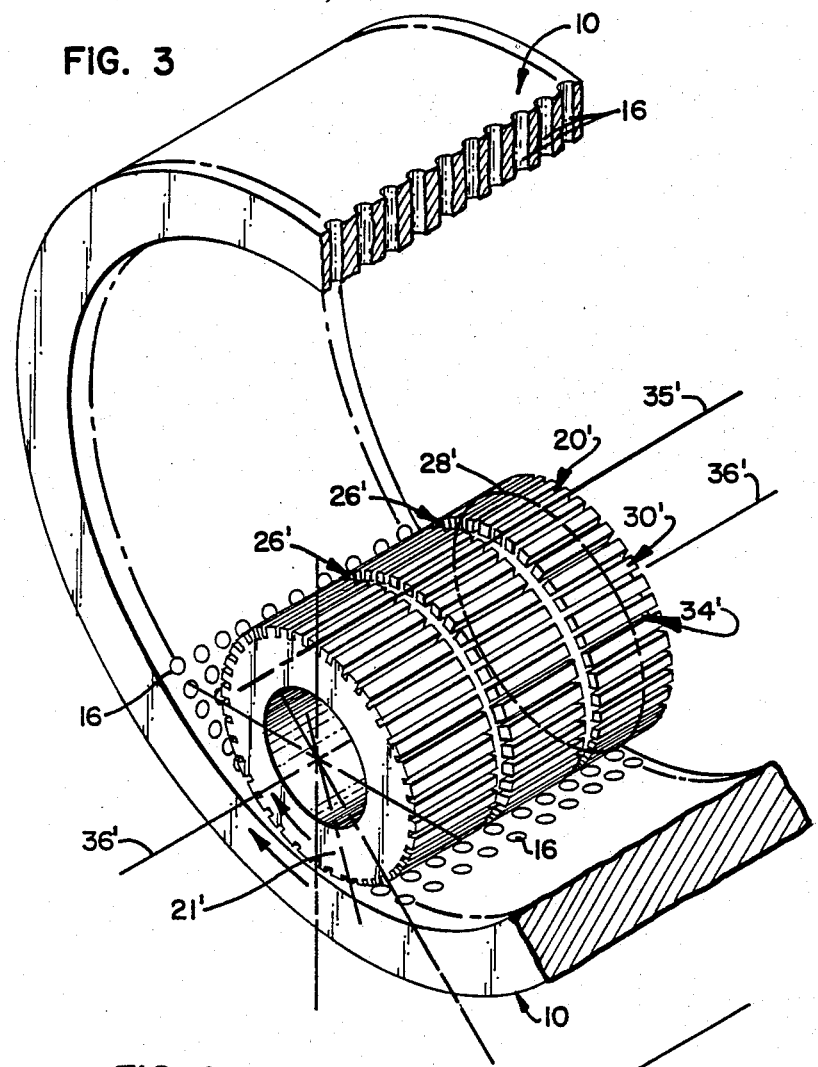
FIG. 3 is a perspective view of a portion of a die and roller assembly in accordance with the present invention including a single pressure roller having two air relief channels extending around the circumferential outer surface of the roller and parallel to the circumference thereof.
Figure 4:
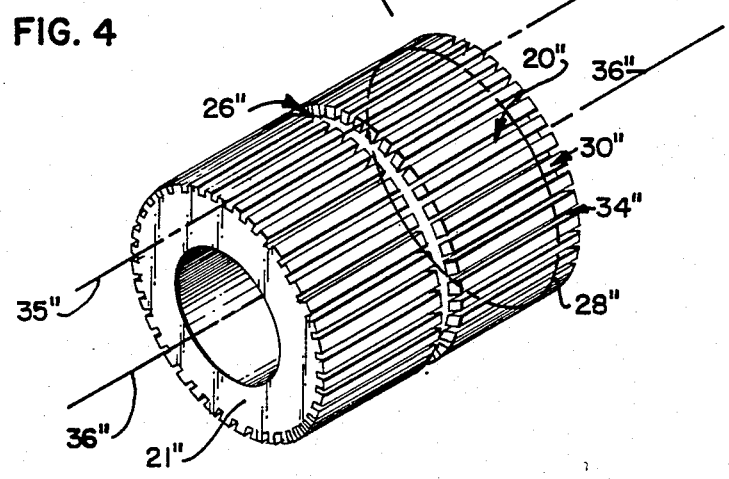
FIG. 4 is a perspective view of an alternate embodiment of the pressure roller of the present invention having a single air relief channel extending around the circumferential outer surface of the pressure roller and parallel to the circumference thereof.
Figure 5:
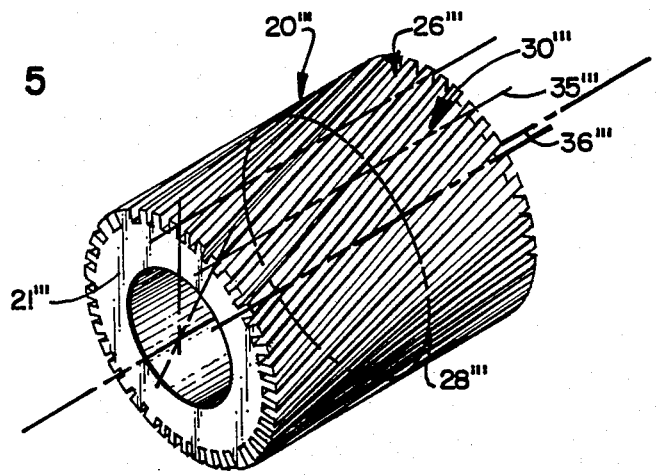
FIG. 5 is a perspective view of an alternate embodiment of the pressure roller of the present invention having a plurality of air relief channels traversing the circumferential surface of the pressure roller at an angle to a line parallel to a longitudinal axis of the roller.
Figure 6:
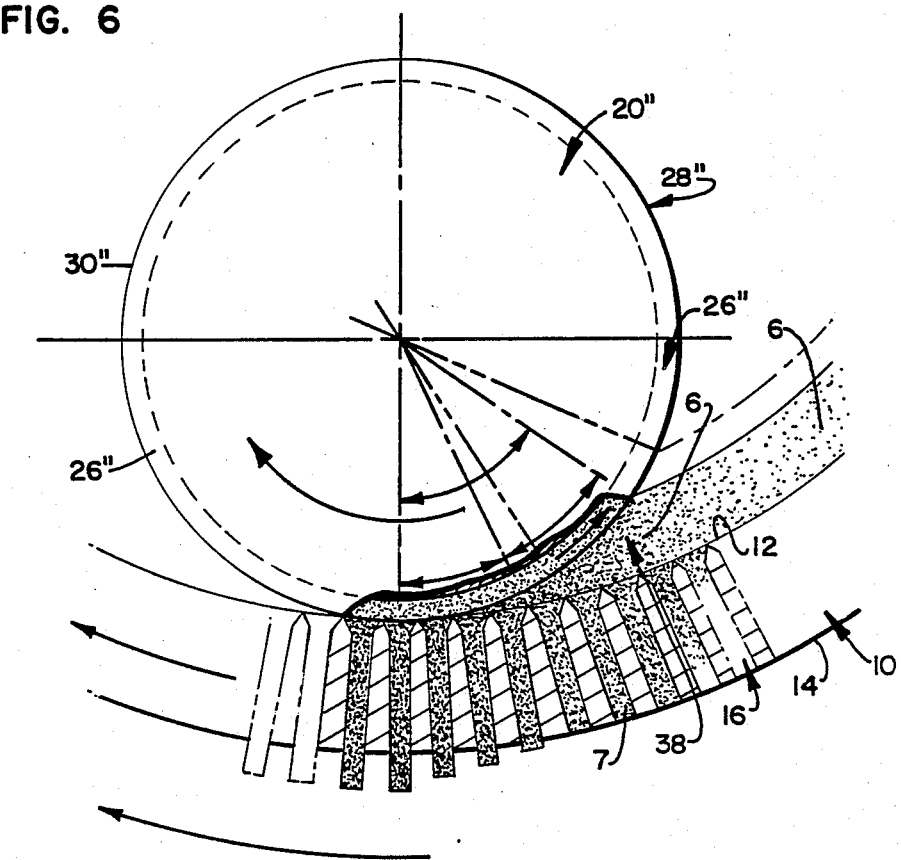
FIG. 6 is a schematic side view of a cross-section of the pressure roller of FIG. 4 which is cut away to show the air relief channel when the roller is compressing feed against the compression surface of an extrusion die during pelleting operations.

Three alternate embodiments of the pressure roller 20 of the present invention are shown in FIGS. 3, 4 and 5. In FIG. 3, a roller 20' has two air relief channels 26' extending around the roller 20' along the circumferential surface 30' of the roller 20' in a plane parallel to a plane of a circumference 28' thereof and at an angle to a line 35' parallel to the longitudinal axis 36'. The roller 20' also includes a plurality of corrugation channels 34' extending across the circumferential surface 30' of the roller 20' parallel to a longitudinal axis 36' of the roller 20'. The corrugation channels 34' are designed to provide traction for the roller 20' on the feed material 6 which forms a feed wedge 38 between the roller 20' and the die 10 as shown in FIGS. 2 and 6.

In FIG. 4, an alternate roller 20" including only a single air relief channel 26" is shown. This channel 26" is similar to the air relief channels 26' shown in FIG. 3 in that it extends around the roller 20" along the circumferential outer surface 30" parallel to a plane of the circumference thereof and intersecting corrugation channels 34" which are parallel to the longitudinal axis 36" of the roller 20". The channel 26" extends at an angle to a line 35" parallel to the longitudinal axis 36".

In yet another alternate embodiment shown FIG. 5, the pressure roller 20''' provides air relief channels 26''' which traverse across the circumferential surface 30''' of the roller 20''' at an angle to a line 35''' parallel to the longitudinal axis 36''' of the roller 20''', as well as at an angle to the circumference 28''' of the outer surface 30'''. In this embodiment, the air relief channels 26''' are designed to provide both traction and air relief for the air entrained in the feed 6 compressed by the roller 20''' during pelleting operations.

The pressure rollers 20 of the present invention are preferably made of material suitable for case hardening, such as steel alloy or the like, and are provided with at least one air relief channel 26. Preferably, one of the four basic types of surfaces presently available to the feed trade is used. These surfaces include: tungsten carbide roll shell surfaces composed of tungsten carbide particles embedded in a weld matrix to provide desired traction characteristics; corrugated shells with corrugation channels such as those shown in FIGS. 3 and 4 and also a modified version where the ends have been closed to reduce side slippage; indented roller shells which include indentations drilled at the outer surface of the roller which fill with feed and produce a friction surface for better traction; and coin-slotted roll shells which include coin shaped slots machined into the outer surface of the pressure roller to improve its traction characteristics.

It will be appreciated that in addition to the alternate embodiments of the present invention which are shown in the drawings, additional alternate embodiments in accordance with the present invention also exist. For example, additional air relief channels 26 in rollers 20 similar to those shown in FIGS. 3 and 4 are envisioned by the present invention. Furthermore, the air relief channel 26 need not extend entirely around the roller 20. For instance, the air relief channel 26" shown in FIG. 4 may be intermittent, providing air relief only at certain places on the circumferential outer surface 30" of the roller 20". This concept is especially significant if there are included on the circumferential surface 30 of the roller 20 a plurality of air relief channels 26. In such a case, the intermittent air relief channels 26 could be coordinated to provide air relief from the feed wedge 38 from the roller 20 and the die 10 when the roller is in any particular position with respect to the feed wedge 38 and the die 10. It is believed that the channels 26 would have to extend around or across the outer surface 30 at least about 5° of the circumference of the outer surface, preferably a distance equal to the surface 30 in contact with the feed wedge 38, in order for the channels to be highly effective. A plurality of air relief channels 26 could also be provided, which would extend around or across the outer surface 30 at a variety of angles with respect to the line 35 parallel to the longitudinal axis 36 and with respect to one another. These channels 26 may be intermittent and may cross one another. The range of possibilities is virtually infinite, so long as the channels 26 provide a passage for air escaping from the feed material 6 as it is compressed.

The rollers 20' and 20" which have air relief channels 26' and 26" which have cross-sectional planes parallel to the respective circumference 28' or 28" or the circular cross-section of the respective roller 20' or 20", extend at angles which are substantially perpendicular to lines 35' and 35", respectively, which are parallel to the longitudinal axes 36' and 36" of the rollers 20' and 20", respectively. Other embodiments of the present invention may include pluralities of air relief channels 26 which traverse the circumferential surface 30 of the roller 20 at angles to a line 35 parallel to the longitudinal axis 36 which are other than the 90° angles of the air relief channels 26' and 26" described hereinabove. Preferably, this angle is at least about 5°, more preferably about 10°, even more preferably about 15°, even more preferably about 20°, and even more preferably about 30°. It is believed that a roller 20 similar to the one shown in FIG. 5 would be most effective if this angle was between about 30°-35°, preferably being about 31.5°. Furthermore, this angle may be such that each of the air relief channels traverse across only about 5° of the 360° of the circumferential surface 30 of the roller. Preferably, the roller 20 of the present invention will include an air relief channel 26 which traverses a number of degrees along the circumferential surface 30 of the roller 20 at least about equivalent to the number of degrees along the circumferential surface 30 which is adjacent to and in contact with the feed wedge 38. This is believed to allow for the most effective air passage from the feed wedge 38 for the air entrained therein.

In FIG. 6, a schematic side view of a cross-section of the pressure roller 20" of FIG. 4 is shown. The roller 20" is partially cut away to show the air relief channel 26" during pelleting operations wherein the roller 20" compresses feed 6 against the compression surface 12 of the extrusion die 10. The feed wedge 38 is the feed material 6 between the roller 20" and the extrusion die 10 in the area beneath the outer surface 30" of the roller 20" which is in contact with the feed material 6. The roller 20" and the extrusion die 10 both turn in a clockwise direction as the roller 20" and the extrusion die 10 turn and the particulate feed material 6 is compressed and forced through extrusion passages 16. It is the feed material 6 within the feed wedge 38 which is compressed by the roller 20" in concert with the extrusion die 10. As the feed material 6 in the wedge 38 is compressed, air entrained in the particulate feed material 6 is forced out and must go somewhere. When this occurs, the air relief channel 26" provides a passage which channels the air escaping from the particulate feed material 6. The air passes away from the feed wedge 38 through the air relief channel 26" in the recessed passage provided by the channel 26". In alternate embodiments which may be preferable, the depth of air relief channels 26 will be deeper than the depth of the corrugation channels 34.

It will be appreciated that a die and roller assembly 4 which is provided with a roller 20 in accordance with the present invention will enable feed producers to produce more feed pellets at a lower capital cost for extrusion dies 10 because the pressure rollers 20 of the present invention allow for reduced frictional wear upon the inner surface 12 of the extrusion dies 10 during pelleting operations. This is especially true with feeds having densities less than about 32 pounds per cubic feet. For example, when feed producers wish to include substantial amounts of whey, which has a very low density, the feed densities can approach about 28 pounds per cubic feet. While whey is very desirable for some feeds, particularly those for young animals such as young pigs and the like, it is also very hard on the die and roller assemblies 4 of the pellet mills 2. This is because of the large amount of air entrained in the feeds having lower densities such as those which include substantial amounts of whey. Because there is a large amount of air entrained in such feeds, there generally tends to be a larger problem with feed being pushed out in front of the roller 20 as the roller 20 compresses the feed 6 against the extrusion die 10. This in turn, results in a larger build up in front of the roller 20 and the feed wedge 38, which causes a greater frequency of roll slips wherein the extrusion die 10 encounters significant frictional wear. The rollers 20 of the present invention provide channels 26 for the air entrained in the feed 6 so that the air may escape from the feed wedge 38 as it is compressed, thereby lessening the likelihood for a significant frequency of roll slips. This reduces the frictional wear on the extrusion die 10 which occurs over long periods of time, thereby increasing the useful life of the roller and die assembly 4.

The width and depth of the air relief channels 26 are believed to be important because they affect the escaping air velocity. Because empirical studies have shown that the escaping air velocity should be between about 700–1300 feet per minute to avoid production inefficiencies, variations of the channel parameters may be desireable to vary the escaping air velocities. It is believed that air velocities below about 700 ft/min may result in channels 26 which can become plugged with feed material. On the other hand, as the air velocities begin to exceed about 1300 ft/min the pellet mill often begins hum or emit a high pitched noise which is undesireable. It is believed that the escaping air velocity which is most desireable is an air velocity which is as low as possible, but which does not permit the channels 26 to become plugged with feed. Therefore, it is believed that the most desireable air velocities are around about 700 ft/min so long as this velocity does not allow the channels 26 to become plugged.

The invention will be further described by reference to the following detailed example.

EXAMPLE

A pressure roller with two air relief channels similar to the pressure roller shown in FIG. 3 was used in a pellet mill operation in conjunction with an extrusion die having the following die specifications: Extrusion passages—11/64" cross-sectional diameter×2½" passage length (initial die thickness), with ¼" variable relief (stainless steel die hardened to a "52 Rockwell"). The operation of this die and roller assembly was compared with a similar corrugated pressure roller which did not have air relief channels. This roller was paired with an extrusion die having the following die specifications: Extrusion passages—11/64" cross-sectional diameter×2 ½" passage length (initial die thickness), with ¼" relief in outer two rows (stainless steel die hardened to a "52 Rockwell"). The extrusion dies used with the two pressure rollers are roughly comparable. Both of the pressure rollers were made of A-2 type stainless steel which was case hardened or heated to a "52 Rockwell" (ASME Standard).

Comparable feed materials having densities as low as about 28 pounds per cubic foot were fed into the pellet mills two die and roller assemblies over a period of many months. After a long period of use, each of the die and roller assemblies showed wear and required replacement as is the normal course of events. The inventive roller was used with its respective die for a period of approximately 10 months. During this time, 8,687 tons of feed was pelletized through the die and roller assembly at a die cost of 27 cents per ton. On the other hand, the die and roller assembly including the corrugated roller without air relief channels was used approximately 13 months, but had a throughput of only 5,206 tons of feed material. With such a low throughput of feed material, the die cost per ton was 42 cents which was much higher than the die cost per ton for the die and roller assembly including the inventive roller having two air relief channels.

While certain representative embodiments of the present invention have been described herein for the purposes of illustration, it will be apparent to those skilled in the art that modifications therein may be made without departing from the spirit and scope of the present invention.

What is claimed is:

1. A pressure roller for cooperative drive relation with an annular inner surface of an annular rotative extrusion die of a pellet mill, said pressure roller comprising a substantially circular ring having a substantially circular cross-section, a circumferential outer surface and a longitudinal axis, said circular ring including air relief means in said outer surface for channeling air escaping from particulate material compressed between said roller and the inner surface of the extrusion die, said air relief means including an air relief channel, said channel including channeling means for cooperating with the extrusion die to channel air escaping from particulate feed material compressed between the roller and the die through said channel at a velocity of at least about 700 ft/min and not greater than about 1,300 ft/min during operation of the pellet mill, and said channel extending at an angle with respect to a line parallel to said longitudinal axis.

2. The pressure roller of claim 1, said angle being in a range from about 5° to about 90°.

3. The pressure roller of claim 2, said air relief means including a plurality of air relief channels in said outer surface extending at a uniform angle with respect to a line parallel to said longitudinal axis, said channels traversing across said outer surface.

4. The pressure roller of claim 1, said angle being about 90°.

5. The pressure roller of claim 4, said air relief means including a plurality of air relief channels in said outer surface extending at a uniform angle with respect to a line parallel to said longitudinal axis.

6. A pressure roller for a pellet mill having an extrusion die, the extrusion die having an annular inner surface, said pressure roller comprising a circular ring having a substantially circular cross-section, a circumferential outer surface and a longitudinal axis, said outer surface including at least one air relief channel extending along said outer surface at an angle with respect to a line parallel to said longitudinal axis, each air relief channel providing channeling means for channeling air escaping from particulate material compressed between said roller and the inner surface of the extrusion die, each channel including channeling means for cooperating with the extrusion die to channel air escaping from particulate feed material compressed between the roller and the die through said channel at an air velocity of at least about 700 ft/min and not greater than about 1300 ft/min during operation of the pellet mill.

7. The pressure roller of claim 6, said angle being in a range from about 5° to about 90°.

8. The pressure roller of claim 7, said outer surface including a plurality of air relief channels in said outer surface extending at an angle with respect to a line parallel to said longitudinal axis.

9. The pressure roller of claim 8, said plurality of channels extending at a uniform angle with respect to a line parallel to said longitudinal axis.

10. The pressure roller of claim 9, said outer surface having opposing edges, said plurality of channels traversing across said outer surface from one edge to the other.

11. The pressure roller of claim 6, said angle being about 90°.

12. The pressure roller of claim 11, said channel extending circumferentially around said roller.

13. The pressure roller of claim 12, said outer surface including a plurality of air relief channels, said channels extending at a uniform angle with respect to a line parallel to said longitudinal axis.

14. A pressure roller for a pellet mill, the pellet mill including an extrusion die having an annular inner surface, said pressure roller comprising a circular ring having a substantially circular cross-section, a circumferential outer surface and a longitudinal axis, said outer surface including at least one air relief channel extending circumferentially around said outer surface an an angle to a line parallel to said longitudinal axis, said angle being about 90°, each air relief channel providing a passage for air escaping from particulate material compressed between said roller and the inner surface of the extrusion die during operation of the pellet mill, each channel including channeling means for cooperating with the extrusion die to channel air escaping from particulate feed material compressed between the roller and the die through said channel at an air velocity of at least about 700 ft/min and not greater than about 1300 ft/min during operation of the pellet mill.

15. The pressure roller of claim 14, said outer surface including a plurality of air relief channels extending around said outer surface at a uniform angle to a line parallel to said longitudinal axis.

16. A pressure roller for a pellet mill, the pellet mill including an extrusion die having an annular inner surface, said pressure roller comprising a circular ring having substantially circular cross-section, a circumferential outer surface and a longitudinal axis, said outer surface including a plurality of air relief channels extending at a uniform angle with respect to a line parallel to said longitudinal axis, said angle being in a range from about 50° to about 90° said plurality of channels providing a passage for air escaping from particulate material compressed between said roller and the inner surface of the extrusion die, each channel including channeling means for cooperating with the extrusion die to channel air escaping from particulate feed material compressed between the roller and the die through said channel at an air velocity of at least about 700 ft/min and not greater than about 1300 ft/min during operation of the pellet mill.

17. A die and roller assembly for incorporation into a pellet mill, said assembly comprising:
(a) an extrusion die having an annular inner surface and an outer extrusion surface;
(b) a plurality of pressure rollers, each of said pressure rollers being a circular ring having a substantially circular cross-section, a circumferential outer surface and a longitudinal axis, said outer surface including air relief means for providing passage means for air entrained in particulate material being compressed between said roller and said inner surface of said extrusion die as the air escapes from said particulate material, said air relief means of each roller including an air relief channel in said outer surface extending at an angle to a line parallel to said longitudinal axis, each of said air relief channels including channeling means for cooperating with the extrusion die to channel air escaping from particulate feed material compressed between the roller and the die through said channel at an air velocity of at least about 700 ft/min and not greater than about 1,300 ft/min during operation of the pellet mill; and
(c) interconnecting means for interconnecting said rollers and said extrusion die so as to allow a cooperative drive relationship therebetween.

18. The die and roller assembly of claim 17, said air relief means including a plurality of air relief channels in said outer surface extending at a uniform angle with respect to a line parallel to said longitudianal axis.

19. A method of providing air relief during a process of extruding pellets made of compressed feed material, said method comprising:
(a) providing a pellet mill having a die and roller assembly including a pressure roller including an air relief channel, said pressure roller including a circular ring having a substantially circular cross-section, a circumferential outer surface and a longitudinal axis, said air relief channel cooperating with the extrusion die to allow air to escape at an air velocity of at least about 700 ft/min and not greater than about 1300 ft/min from feed material compressed between said die and roller assembly during operation of the pellet mill, and extending about said circumferential outer surface at an angle to a line parallel to said longitudinal axis;
(b) introducing particulate feed material into said pellet mill such that the particulate feed material can be compressed in the die and roller assembly; and (c) compressing the particulate feed material between said outer surface of said roller and an annular inner surface of the die such that air escapes from the particulate material through said air relief channel at a velocity of at least about 700 ft/min and not greater than about 1300 ft/min as the particulate material is compressed.

20. A method of providing air relief during a process of extruding pellets made of compressed feed material, said method comprising:

(a) providing a pellet mill having a die and roller assembly including:
  (i) an extrusion die having an annular inner surface, an outer extrusion surface and a plurality of extrusion passages therebetween;
  (ii) a plurality of pressure roller, each of said pressure rollers including a circular ring having a substantially circular cross-section, a circumferential outer surface and a longitudinal axis, said outer surface including air relief means for providing passage means for air entrained in particulate material being compressed between said roller and said inner surface of said extrusion die as the air escapes from said particulate material, said air relief means of each roller including an air relief channel in said outer surface extending at an angle to a line parallel to said longitudinal axis, said channel cooperating with the extrusion die to permit air to escape at an air velocity of at least about 700 ft/min and not greater than about 1300 ft/min from particulate feed material compressed between the roller and the die during operation of the pellet mill;
  (iii) means for interconnecting said rollers and said extrusion die so as to allow for a cooperative drive relationship therebetween; and
  (iv) means for feeding particulate feed material onto the inner surface of said extrusion die for subsequent compression and extrusion thereof;

(b) introducing particulate feed material into said pellet mill; and (c) compressing the particulate material between said outer surface of said rollers and said inner annular surface of said extrusion die such that air escapes from the particulate material through said air relief channels at an air velocity of at least about 700 ft/min and not greater than about 1300 ft/min as the particulate material is compressed, wherein the compressed particulate material is forced through said extrusion passages and formed into pellets.

21. A method of providing air relief during a process of pelleting particulate feed material in a pellet mill, said method comprising the steps of:

(a) providing a pellet mill including a pressure roller and an extrusion die having an annular inner surface of an extrusion die having an annular inner surface, the pressure roller and the extrusion die having a cooperative drive relationship, the extrusion die including a plurality of extrusion passages, the pressure roller including a substantially circular ring having a substantially circular cross-section, a circumferential outer surface and a longitudinal axis, the roller having air relief means in the outer surface for channeling air escaping from particulate feed material compressed between the roller and the die, said air relief means including at least one air relief channel, each air relief channel cooperating with the extrusion die to permit air to escape at an air velocity of at least about 700 ft/min and not greater than about 1300 ft/min from the particulate feed material compressed between the roller and die, and extending at angle with respect to a line parallel to the longitudinal axis; and (b) compressing particulate feed material between the roller and the inner annular surface of the extrusion die such that air escapes from the particulate material through said air relief means at an air velocity of at least about 700 ft/min and not greater than about 1300 ft/min when the particulate material is compressed, wherein the feed material is extruded through said extrusion passages to form pellets.

* * * * *